United States Patent
Remy et al.

[11] 3,894,806
[45] July 15, 1975

[54] METHOD AND APPARATUS FOR TESTING TRANSPARENT CONTAINERS

[75] Inventors: Ernst Remy; Henning Von Siemens, both of Munich, Germany

[73] Assignee: Efratom California Inc., Costa Mesa, Calif.

[22] Filed: Oct. 31, 1973

[21] Appl. No.: 411,236

[30] Foreign Application Priority Data
Oct. 31, 1972  Germany.............................. 2253445

[52] U.S. Cl............... 356/240; 250/223 B; 356/209
[51] Int. Cl.² ........................................... B67C 1/14
[58] Field of Search .......... 356/209, 210, 211, 212, 356/240, 198; 250/223 B

[56] References Cited
UNITED STATES PATENTS

| | | | |
|---|---|---|---|
| 2,902,151 | 9/1959 | Miles et al....................... | 250/223 B |
| 3,180,994 | 4/1965 | Rottmann ............................ | 356/198 |
| 3,218,463 | 11/1965 | Calhoun............................. | 356/240 |
| 3,758,215 | 9/1973 | Parvolo et al................... | 250/223 B |
| 3,777,169 | 12/1973 | Walter et al......................... | 356/240 |

*Primary Examiner*—Ronald L. Wibert
*Assistant Examiner*—Richard A. Rosenberger
*Attorney, Agent, or Firm*—Bierman & Bierman

[57] ABSTRACT

A method and apparatus for testing transparent containers such as bottles in which the scattering of a light beam entering the container opening is observed and measured.

22 Claims, 3 Drawing Figures

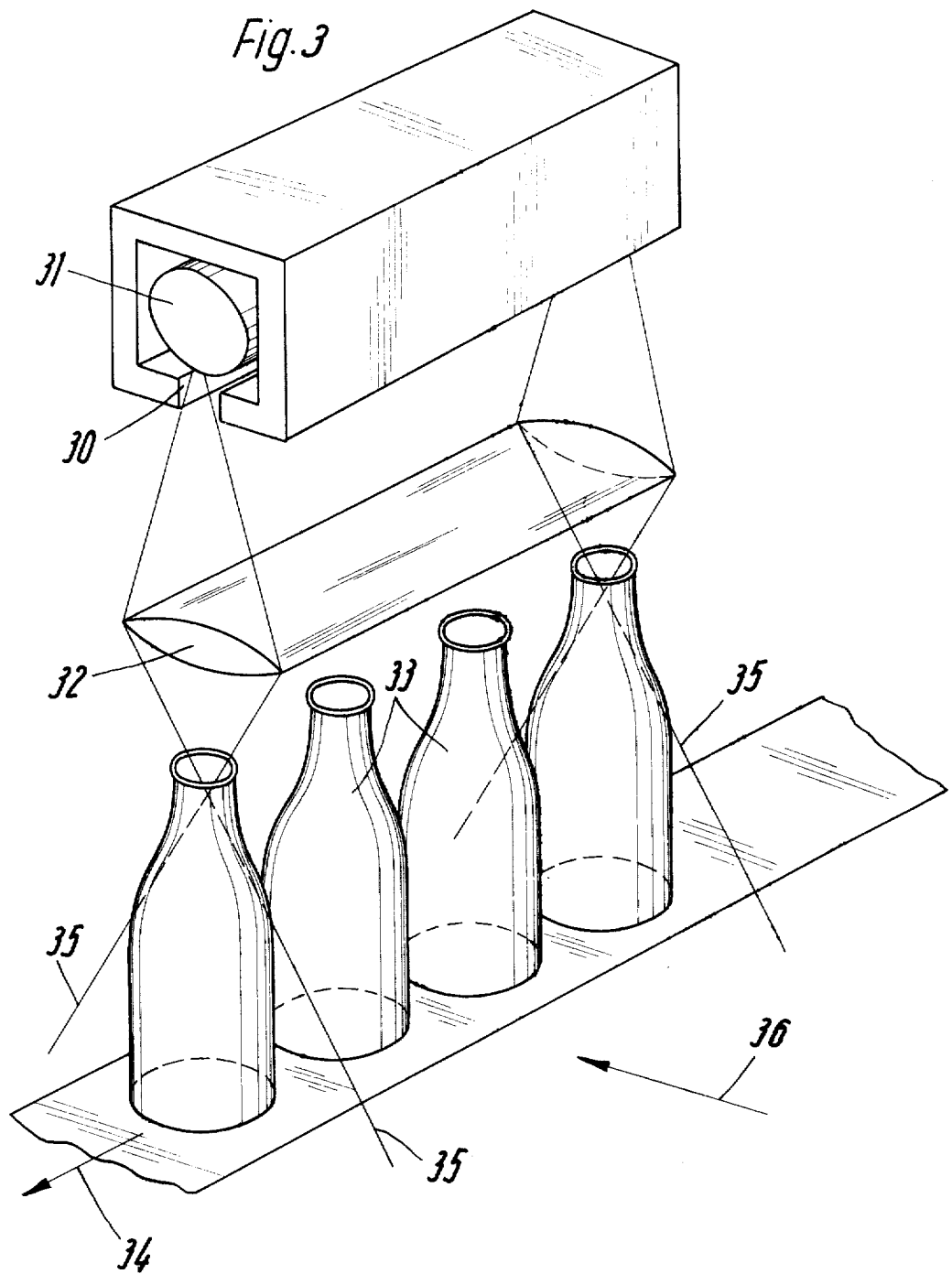

METHOD AND APPARATUS FOR TESTING TRANSPARENT CONTAINERS

This invention relates to a method for testing transparent containers, particularly beer bottles, where a light beam enters the container from a light source through an optical system through the container opening, and the light scattered from the beam is observed or measured.

For testing transparent containers, for example bottles, it is known to use a number of transillumination methods. In many cases these are bright field methods, in which one or more photosensitive receivers is arranged in the path of rays of one or more light sources which either transilluminates the container in transverse direction (DAS 1,096,641 and 1,164,706; DOS 2,100,729) or which transilluminate the container bottom in longitudinal direction through the container opening (DAS 1,106,521). Small foreign particles or impurities are not sufficiently detectable in this manner. Another method, equally ineffective, is known (DAS 1,020,812) in which radiation is directed into the container through the container opening, the container wall being impervious to the radiation. The radiation reflected on the inner container wall and back through the container opening is measured. In this method too, the differences between the rays getting into the receiver from the clean container wall and from an impurity or foreign particle are too small or not specific enough to ensure reliablity with respect to minor or relatively uniformly distributed impurities.

In practice, particularly in the testing of washed bottles which are to be used again in breweries and racking stations, has heretofore been impossible to effect a satisfactory and reliable control which was fully automatic. Control by the human eye, at least in addition to the automatic control of partial regions of the container, like bottom or neck, is still necessary. Particularly in the control of beer bottles, the drying foam residues deposited on the walls and neck present a rather delicate problem. Residues still remaining after the washing can not be reliably detected with the presently available transillumination and other testing devices.

The invention is therefore directed to providing a reliable measuring method of the above-described type which responds to even minor or finely distributed impurities, and a device for carrying out this method.

The prior art problems are solved by a method comprising illuminating substantially the entire inner surface of the container by means of a diverging cone of rays which originates from an intermediate image of the light source produced by the optical system in the range of the bottle neck or directly above it and which measures or views the light scattered by impurities on the inside of the bottle through the container wall.

It was found that with such an illumination of the inner surface by means of a diverging cone of rays, all regions of the container, particularly the shoulders adjoining the neck in beer bottles, where foam deposits appear frequently, can be clearly examined. Even minor or finely distributed impurities yield clearly noticeable scattered light phenomena which can be readily and reliably demonstrated by the receiver arranged outside the cone of rays and which can be contrasted with the background. Thus the present invention provides a marked departure from conventional methods. Further, this invention lends itself especially to automatic detection of defects.

The exact location of the intermediate image of the focal point from which the beam diverges depends on the specific shape of the containers to be tested. Particularly in beer bottles with their shoulders extending obliquely to the neck, it is advantageous if the intermediate image of the light source is so arranged and the beam is so defined that the outer rays of the beam extend substantially tangentially to the shoulder of the bottle neck.

In the known methods, where the container is only illuminated or transilluminated in spots or regions, the incident beam and/or the viewing ray must be returned during the measurement relative to the container, so that all container regions can be illuminated successively. This rotation of the beam during the measurement is time-consuming and is therefore not suitable for control measurements which are to keep pace with the high-speed of modern bottle washing and filling plants which process up to 15 bottles per second. In the method according to this invention, where substantially the entire inner surface of the container is illuminated at the same time, the rotation can be eliminated, if we proceed in an advantageous further development of the invention, so that an image of the container is produced with an optical system directed transverse to the direction of the beam and the image is scanned with photosensitive elements. The scanning can be so effected, for example, that the container is imaged on an arrangement of juxtaposed and/or superposed photocells, each of which generates signals associated with the scattered light coming from a certain container region. Preferably, however, the image is scanned linearly.

Preferably several images are produced which are distributed over the height and/or about the axis of the container and of the beam, and these images are scanned or measured integrally.

The method according to the invention is a dark field method, that is, substantially only light signals originating from impurities arrive in the receiver or receivers, and the background of the signals is very small. In order to further improve the difference of the signal from the background and to be able to carry out the method in daylight or under extraneous light or when the container is in rapid motion, the light source and/or the instrument measuring the scatter light is preferably operated with alternating light. For example, by selecting a frequency which differs from the frequency of ambient light we can filter out portions originating from the room light source in evaluating the scattered light. If the moving container is illuminated with a very short light impulse, an "instantaneous" image of the container is formed, for example, on a screen of the scanning device which can be scanned even after the light impulse has disappeared.

The invention also concerns a device for carrying out the above-mentioned method, which contains an optical system with a light source for the production of a beam, a supporting-and centering mechanism for the containers in such a way that the beam enters the container opening, and a measuring instrument for the light scattered from the beam, arranged outside the beam. Such a device is characterized according to this invention in that the optical system, whose axis coincides substantially with the container axis, produces a point of intersection of the rays of the beam in the range of the bottle neck or directly above it, and that the measuring instrument is arranged substantially abreast of the container outside the beam.

The measuring instrument has preferably an optical system imaging the container or partial regions of the container and has preferably an arrangement scanning this image linearly and generating signals corresponding to the light intensity. In particular the measuring instrument can be designed in the manner of a television camera with Vidicon tube. Preferably several measuring instruments are provided, particularly in an arrangement symmetrically distributed about the container axis.

For the above-mentioned reasons the light source and the measuring instrument are preferably controlled by alternating light or by impulses. To this end we can also work, for example, in a narrow spectral region in which the light source radiates selectively and the receiver is selectively sensitive. A particularly suitable light source for both cases, which is therefore preferred according to the invention, is a laser. Preferably, the impulse beat of the light source and/or measuring instrument is synchronized with the feeding and removing of the containers.

Preferably a measuring signal-processing logical unit is connected to the measuring instrument or line scanner which releases a warning and/or control signal when a given impulse height, width and/or frequency is exceeded. The minimum size and/or number of impurities at which the device is to respond can be set by a corresponding setting of the response threshold.

The device according to the invention is particularly suitable for testing the lateral container walls, and especially the shoulders of the container. Surprisingly, it was found that impurities or foreign particles on the container bottom can also be readily detected. If certain regions of the container, for example, the rim surrounding the opening, can not be controlled this way, or insufficiently, or only at great cost, it is readily possible to combine this device with another device for testing this region, for example, the bottle neck, or to arrange it ahead of or behind this device and it can likewise work on the same principle.

An embodiment of the invention is more fully described in the drawings.

FIG. 3 shows another embodiment of the measuring arrangement.

Figure 1:
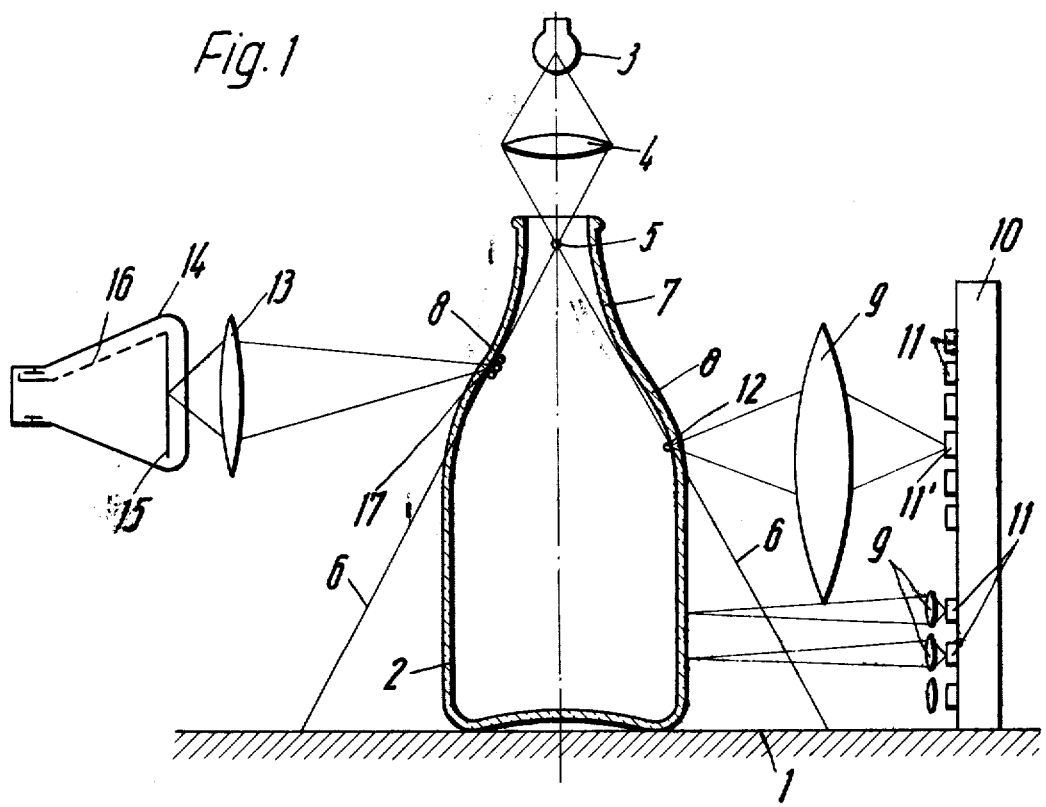
FIG. 1 shows a diagrammatic sketch of the measuring arrangement seen from the side.

According to FIG. 1, a bottle 2 resting on a supporting surface 1, e.g. a conveyor belt, is illuminated by means of a beam which originates from a light-source 3 indicated as a lamp, is concentrated in a focal point 5 by an optical system indicated as a lens 4, and, diverging from this point, enters through the bottle opening. The focal point 5 is a point of intersection for all rays of the beam and an intermediate image of the light source 3. It is located with respect to the neck 7 of bottle 2 so that the outer limiting rays 6, 6' of the beam extend substantially tangentially to the beveled shoulders 8 of the bottle. This has the effect of efficiently illuminating the inner surface of the shoulders 8 where, as is well known in the art, foam deposits are likely to occur. This shoulder illumination is not achieved by prior art methods, most of which cast shadows on such bottle shoulders. All other regions of the inner wall and of the bottom are likewise well illuminated at the same time by the rays in the interior of the beam. (e.g. 6'').

If there are no foreign particles or impurities on the illuminated inner surfaces of bottle 2, no light is scattered from the beam defined by the rays 6, 6'. The field of view of a photosensitive receiver arranged outside the beam, remains dark. But if there are foreign particles on the inner surface of the container the light is scattered and it issues through the transparent wall of the bottle 2 to the outside and can be detected there. An example of a detector is shown in the right portion of FIG. 1. It consists of a receiver 11, 11' etc. and of means for imaging the container or its regions on the photocells, for example, in the form of an optical system common to all photocells (indicated by the lens 9) or individual optical systems associated with each photocell (as indicated by the individual lenses 9'). The scattered light originating from a foreign particle 12 is focused by the optical system on a photocell 11' assigned to the corresponding region so that the latter gives off a signal.

Another preferred embodiment of the detector according to the invention is shown in the left portion of FIG. 1. It consists of an optical system indicated by a lens 13 and of a picture scanning tube (Vidicon tube) 14, where an anode 15 with a conductivity depending on the light intensity is scanned linearly by an electron beam 16. The optical system 13 and the Vidicon tube 14 form together an arrangement corresponding principally to a television camera. Scattered light, which originates from impurities 17 on the inner surface of bottle 2, is focused by the optical system 13 on a certain point of the photo-anode 15, and when this point is scanned by the electron beam 16, a signal impulse appears at the output of the Vidicon tube.

Figure 2:
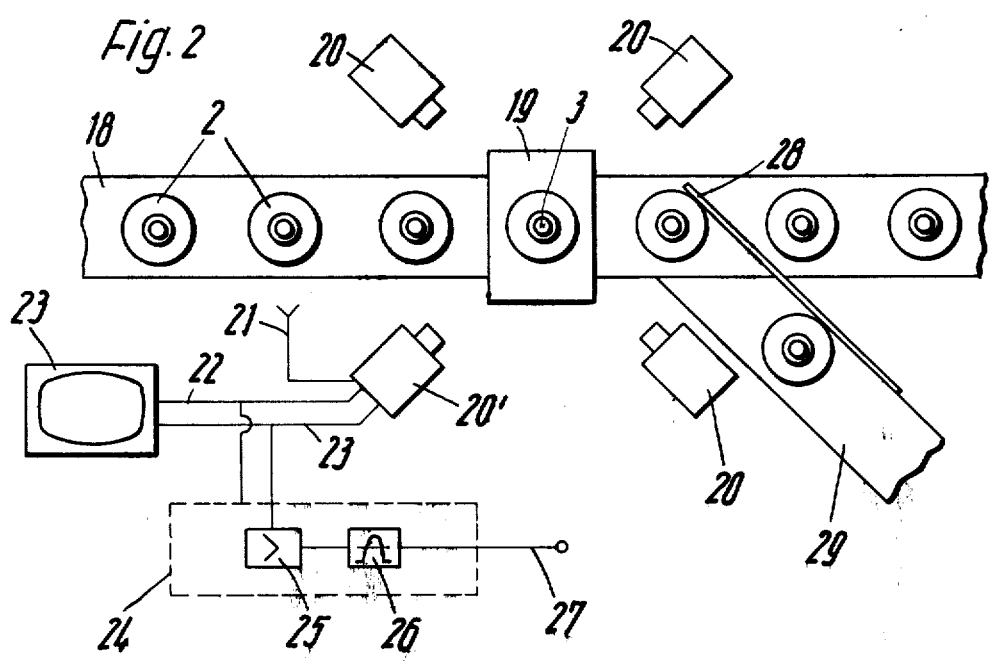
FIG. 2 shows a diagrammatic sketch of the measuring arrangement, seen from the top with a block circuit diagram of the impulse evaluation instrument.

In the arrangement represented in FIG. 2, 18 denotes a conveyer belt or any other conveyer means which feeds bottles 2 successively to a measuring point 19 where the bottles are illuminated by means of the light source 3 in the manner indicated in FIG. 1. The scattered light originating from impurities or foreign particles is collected by four line scanning receivers 20, 20' arranged around the measuring point 19. These consist of an optical system and of a Vidicon tube, or of any other measuring arrangement, for example the photocells of FIG. 1. These receivers 20, 20' are connected to a logical circuit evaluating the signal impulses which is represented in the drawing schematically for simplicity's sake only for receiver 20'. To an input 21 are fed impulses for synchronizing the scanning with coneyer 18.

An output 22 of the line-scanning receiver 20' is connected to a monitor 23 with a picture tube for control and adjustment in order to synchronize the run of its lines with those of receiver 20'. At the output 23 of the receiver 20' are tapped the signal impulses proper which appear during the scanning of an impurity of foreign particle. These are also fed to the monitor 23 as bright/dark signals. The output 23 is connected to an impulse-evaluating logical circuit which is indicated by the box 24 in broken lines. In its simplest form the logical circuit contains an amplifier 25 and an impulse height discriminator 26, so that only impulses which exceed a given, preferably adjustable, threshold amplitude appear at the output 27 as control signals. Additional impulse or signal processing members can be provided in the logical circuit 24, for example impulse width discriminators, differentiating members, integrators, frequency filters and frequency converters.

In the represented embodiment, the logical circuit 24 detects only those dirt or foreign particles which cause scattered light of a certain minimum intensity. If an impulse width discriminator is used, the extension of the scattering object can also be determined. Another embodiment can contain additionally an integrator. The latter adds up the total number of impulses given off by the Vidicon tube, that is, an integration over amount and size of the scattering objects takes place. An adjoining threshold member or a discriminator generates an output signal when the integrated signal exceeds a certain value. This has the effect that bottles with a turbidity can be separated. A turbidity has possibly no scattering center whose size or brightness in itself would make the device respond.

By further extension, the logical circuit 24 has the effect that additional criteria such as the width of transition interval of the signal impulses (first differentiation) or the curvature of the impulse curve (second differentiation) can be used for the discrimination. This way it is possible to separate according to special features the scattered light which originates, for example, from the bottle boundary or from external features of the bottle, e.g. impressed letters, scratches and the like. In particular specific impurities, like cigarette butts, ashes, albumin or lye residues can be determined this way.

A further extension of the logical circuit is possible when using a color Vidicon tube by the discrimination according to color values. For example, the bottle or the container to be tested can be run in front of a background with a certain basic color. This has the effect that the device remains disconnected as long as the Vidicon tube scans the background. The same effect could be achieved, for example, by the arrangement of masks in the path of rays. Furthermore, any impulse jump, produced by the bottle rim entering the field of view, can be suppressed by a lag element.

The output signal appearing at the output 27 of the logical circuit 24 can be used for the release of an alarm signal and/or for the automatic separation of the defective bottle. For example, the output signal can effect the turning of a switch 28 into the path of the bottles on conveyer 18, so that the bottles to be separated are deflected to a shunt track 29. Such controllable switches for deflecting defective containers from the delivery flow are known in the art as are other separating means such as a rotating drum.

Particularly useful as the light source 3 is a laser. The wavelength of the light used for the measurement can be in the visible or in the invisible range, but for obvious reasons it must be in the transmission range of the material of the container. The laser or the light source is operated preferably by impulses, the impulse beat being coupled preferably with the impulse beat or line frequency of the scanner 20, 20' and both being controlled in timed sequence by the passage of the containers. In particular the duration of the impulses can be selected so short that practically a "snapshot" of the moving container is produced or measured.

The path of the illuminating rays need not be axially symmetrical to the axis of the bottle. FIG. 3 shows an arrangement where several containers are illuminated simultaneously. A slit orifice 30 in front of an elongated tubular lamp 31, for example, forms the light source, of which an elongated cylinder lens 32 produces a linear intermediate image in the range of the necks of the bottles 33 arranged underneath. The path of rays forms an elongated light curtain defined by rays 35, which has in its cross section the form shown in FIG. 1, the bottles passing through this curtain in longitudinal direction. (arrow 34). In visual observation in transverse direction (arrow 36) all impurities appear as bright light spots. Thus one can view several bottles simultaneously so that the velocity of the presentation of the bottles can be increased. The arrangement according to FIG. 3 is suitable not only for visual observation but also for automatic measurements if measuring instruments with an optical imaging system according to FIG. 1 are provided. In all the above described arrangements, the scattered light originating from the respective container to be viewed or from its partial region can be diaphragmed out and extraneous light can be retained to using stencil-type masks or diaphragms.

What is claimed is:

1. A method of examining a transparent container having an opening, such as a bottle, for imperfections and impurities, which method comprises shining into said container through said opening a divergent beam of light, illuminating substantially the entire surface of the container at the same time with said divergent beam, and measuring or viewing the light scattered by the imperfections of impurities when illuminated by said beam.

2. The method of claim 1 in which the container is a narrow-necked bottle having oblique shoulders between the neck and its lateral sides, the beam being made to converge at a point such that the peripheral rays divergent from said point extend substantially tangentially to the oblique shoulders.

3. The method of claim 2 in which the scattered light is measured by a light measuring means which in turn activates an automatic separation means such that a bottle which emits scattered light above a predetermined threshold limit is automatically separated from other bottles which emit scattered light below the threshold limit.

4. The method of claim 2 in which the illuminated bottle is photoelectrically scanned from a direction essentially transverse to the axis of the beam.

5. The method of claim 4 in which several partial regions of the illuminated bottle are scanned, and the amount of scattered light from each of said regions is separately measured.

6. The method of claim 4 in which the bottle is linearly scanned.

7. The method of claim 4, in which optical images of a plurality of adjacent areas of the container are created and the amounts of light present in each of said images are measured separately.

8. The method of claim 7, wherein said areas are distributed around or along the axis of said beam.

9. The method of claim 1, wherein said beam of light is made to diverge from a point of convergence positioned within or slightly above the container opening.

10. An apparatus for examining a transparent container having an opening, such as a bottle, for imperfections and impurities, which comprises a light source producing a beam of light, an optical system for converging said beam at a point beyond which said beam becomes divergent, a supporting means for the container to be examined, said means positioning the container such that the divergent beam enters the container opening and strikes substantially the entire inner surface of the container, and a light measuring means for measuring light scattered by impurities present in the container, said measuring means being positioned substantially abreast of the container.

11. The apparatus of claim 10 in which the point of convergence of the light is positioned within or slightly above the container opening.

12. The apparatus of claim 10 in which the light measuring means comprises one or more optical systems which image the entire container or partial regions thereof.

13. The apparatus of claim 12 in which the light measuring means further comprises a photo cell associated with each of said optical systems.

14. The apparatus of claim 12 in which the light measuring means further comprises a photoelectric image scanning device, wherein said device scans the image linearly and generates an electric signal proportional to the light intensity of the image.

15. The apparatus of claim 14 in which scanning device is a television camera having a Vidicon tube.

16. The apparatus of claim 10 comprising more than one light measuring means positioned in symmetrical arrangement about the axis of the container.

17. The apparatus of claim 10 in which the light source produces a beam of light having a narrow spectrum, and the light measuring means is sensitive to light in said narrow spectrum.

18. The apparatus of claim 10 in which the light source produces an alternating or pulsating light beam having a predetermined frequency of alternation or pulsation, the measuring means being synchronized with said frequency.

19. The apparatus of claim 18 in which the frequency of the impulses are synchronized with a container feeding means.

20. The apparatus of claim 10 in which the light source is a laser.

21. The apparatus of claim 10 in which the light measuring means comprises a logical circuit which generates a monitoring signal when a given threshold scattered light parameter is exceeded.

22. The apparatus of claim 10 which further comprises a stencil-type mask positioned between the container and the light measuring means, said mask serving to screen out light not originating from the container.

* * * * *